UNITED STATES PATENT OFFICE.

JOHN A. KIESELE, OF NEW YORK, N. Y.

COMPOSITION OF MATTER.

SPECIFICATION forming part of Letters Patent No. 382,882, dated May 15, 1888.

Application filed October 22, 1887. Serial No. 253,127. (Specimens.)

*To all whom it may concern:*

Be it known that I, JOHN AUGUST KIESELE, of the city, county, and State of New York, have invented a new and useful Composition of Matter, which may be used in manufacturing ornamental articles, such as busts, statuettes, &c., of which the following is a specification.

In preparing my composition I take about five parts, by weight, of ozocerite, properly purified or bleached, (in which condition it is known as "ceresine,") and melt the same in any suitable receptacle. To this ozocerite I add from five to seven parts of powdered sugar and thoroughly mix together, causing the sugar to melt in the ozocerite. The above composition may then be run into any suitable mold. When cold, this composition will be found quite firm and durable, the ozocerite giving it toughness and a translucent effect, at the same time preventing brittleness. The sugar renders the composition whitish, without interfering with its translucent effect. For very fine and small ornaments somewhat less sugar may be used, which permits the composition to run more freely, enabling it to enter any small recesses or openings in the mold, which, if the composition were too thick, might be prevented. In fact, the proportions above stated may be varied according to circumstances.

For some purposes, and especially where greater strength is desired than will be given by the mixture of ozocerite and powdered sugar above mentioned, I add about seven parts of stearine to the melted ozocerite and sugar, and thoroughly mix together. The stearine does not interfere with the whiteness or translucent effect of the composition.

I am aware that sugar has been combined with pitch, rosin, or gum, (vegetable matters,) which forms a yielding and non-translucent substance; but my composition is firm and hard, and also translucent, whereby delicate articles—such as ornaments, &c.—may be made, which give pleasing effects by permitting the passage of the light.

Having now described my invention, what I claim is—

The herein-described composition for castings, consisting of ozocerite and sugar, in about the proportions specified.

JOHN A. KIESELE.

Witnesses:
   T. F. BOURNE,
   HARRY M. TURK.